Patented Jan. 30, 1951

2,539,486

UNITED STATES PATENT OFFICE 2,539,486

BENEFICIATION OF RECLAIM PORCELAIN ENAMEL

Donald W. Scott, Columbus, Ohio, assignor, by mesne assignments, to Ferro Enamel Corporation, Cleveland, Ohio, a corporation of Ohio Application April 26, 1946, Serial No. 665,075

3 Claims. (Cl. 209—17)

This invention relates to a method of beneficiating reclaim or over-spray porcelain enamel.

In manufacturing porcelain enamelware, the enamel is sprayed in the form of a slip upon the surface of the articles to be enameled. In order to prevent the sprayed enamel from contaminating the air of the entire plant, the spraying operation is done in booths which are usually completely or partially enclosed and which have flues provided for rapidly withdrawing the air therefrom. In this enameling operation, only about 50 per cent of the enamel sprayed becomes attached to the surfaces of the articles being enameled. The remainder forms the over-spray of which one-half to two-thirds goes up the flue, depending upon the draft, where it is recovered only if the plant has a dust collector installation, and the coarser portion is collected in the spray booth proper.

Porcelain enamel is relatively expensive. Methods of beneficiating this waste or scrap over-spray enamel have long been studied. The two processes which have found most favor in the enamel industry are the blunging process and the resmelting process.

In the blunging method, the waste enamel is screened and the screened enamel is then blunged and allowed to settle partially. Since the clay portion of the enamel is finer than the frit or glass, it tends to settle more slowly and, in this manner, may be partially removed from the waste enamel by decantation. More clay and new enamel slip are then added to this waste enamel and the waste enamel may then be re-used for parts not required to pass rigid inspection.

In the resmelting process, the waste enamel is screened and the screened product is then resmelted along with a considerable proportion of frit-producing ingredients. Comparison of these two methods in the prior literature indicates that while the enameled products produced from the resmelted enamel are superior in gloss to those produced by the blunging process, at least for certain types of enamels; however, the blunging process is by far the cheaper of these two present methods.

While the blunging process and the resmelting process have been partially successful in providing reclaimed enamel which may be used for primary coats in two-coat enameling processes, they do not, however, produce enamels of sufficient purity or gloss for use as final coats on objects requiring a white or light-colored finish. Considerable impetus has been given to the demand for markedly purer reclaim enamel by the wide acceptance by the enamel industry of one-coat enameling processes. The enamels produced by the old methods of beneficiating reclaim enamels do not meet these new standards.

It is, therefore, an object of this invention to provide a method for removing adventitious contaminants from reclaim enamel to permit use of the resulting enamel as a final coat or in one-coat processes.

Another object of this invention is to provide a method for reclaiming enamel which combines simplicity and efficiency of process with the production of sufficiently pure beneficiated reclaim enamel for use in one-coat processes.

Still another object of this invention is to provide a process particularly applicable to the reclamation of white porcelain enamels for subsequent use as such.

A further object of this invention is to provide a method of beneficiating reclaim enamel in which a high percentage of frit recovery is obtained.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
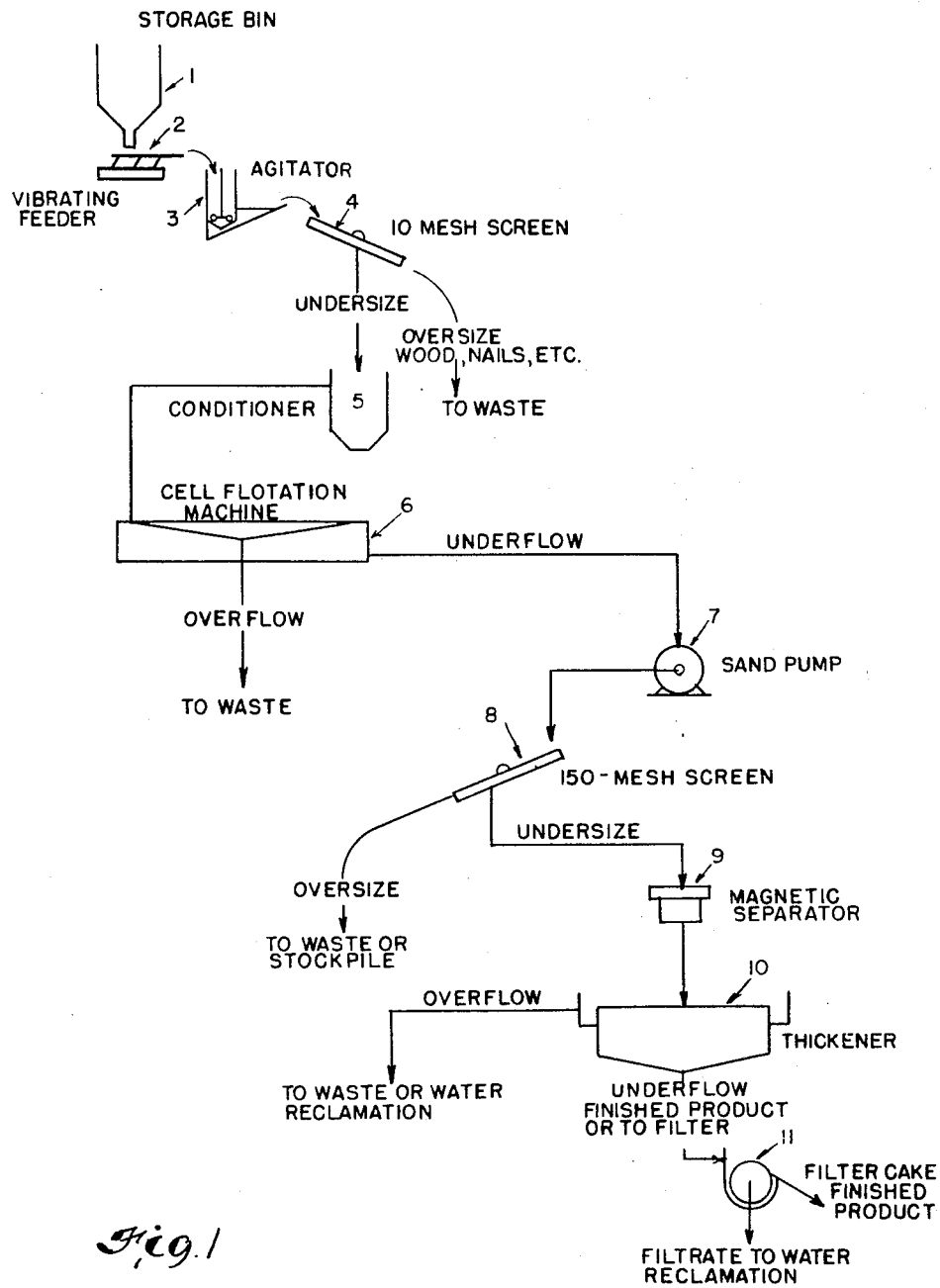
Fig. 1 is a flow sheet of a method for processing booth reclaim.

Broadly stated, this invention comprises a method of beneficiating reclaim or over-spray enamel which includes the step of subjecting the enamel to separation by froth flotation.

Present day porcelain enamel must combine high gloss and reflectance with freedom from surface defects, such as fish scales, pitting, specking, hairlines, orange peel, tearing, blistering, and the like. A typical porcelain enamel as applied to the work consists principally of smelted frit or glass in finely divided form, and minor proportions of so-called mill-additions which comprise clay, opacifier, and electrolytes such as magnesium carbonate, and a color stabilizing ingredient.

The frit forms the base of the enamel, whereas the principal purpose of the clay is to disperse the frit while in the slip form prior to spraying. The opacifier imparts opacity or reflectance to the enamel, and the electrolytes control the workability.

In the spraying process, adventitious ingredients, such as lint, wood fibers, magnetic scale, oxidized particles, bristles, tobacco, and organic materials, become mixed in the enamel. Removal of these impurities is essential, since they may produce dark specks in light-colored enamels or may cause pitting, blistering, or other surface defects.

One of the primary steps of my improved beneficiation process comprises screening the enamel through a sieve at least as fine as 150 mesh and, in certain instances, preferably a finer mesh on the order of 200.

It has been found, also, that the clay in the unprocessed waste enamel loses its dispersing power when dried or partially dried. When additional clay is added to secure the desired and necessary dispersion in the slip, the high clay content causes the enamel to be refractory and to have a poor gloss. For this reason, the spent clay should be removed.

It is also desirable to remove the other ingredients, such as the opacifier, color stabilizing compound, and the like so as to recover only substantially pure frit, because the other ingredients affect the workability of the enamel in a manner not clearly understood, and thus, difficult to control. The pure frit thus recovered may be used in place of new frit or admixed with new frit. In either case it is possible to produce entirely satisfactory results even under the highly exacting conditions and requirements of light colored or white one-coat work.

More specifically, in practicing the method comprising the present invention, the waste enamel is blunged to disperse any agglomerates and subsequently passed through a scavenger screen, such as 10-mesh size, in order to remove such articles as wire hangers, pieces of enameled steel, gloves, wood, etc. In the prior art, it has usually been the practice to screen the reclaimed enamel at mesh sizes rarely exceeding 60 or 80. In the present process, however, it is usually desirable that all enamel be screened at least 150 mesh or finer, depending upon the source from which it is obtained.

Booth enamel, that is, the enamel obtained from the waste material collected in the spraying booth, is coarser in size than the flue enamel obtained in the dust collectors. Furthermore, the booth enamel generally has a lower clay content than the flue enamel. Consequently, booth enamel may be adequately screened at 150 mesh to remove the adventitious impurities, whereas, it is desirable to separately screen the flue enamel at 200 mesh or finer. In both instances, the enamel is screened wet, using a vibrating type screen electrically or mechanically operated and provided with water sprays to keep the enamel particles in a state of mobility. The overflow from the screening operation is discarded or stock-piled for future processing, and the underflow is, in this particular process, delivered to the flotation cells.

At this point in the process, essentially all of the impurities visible to the naked eye are removed. In rare instances where extreme precautions are taken to prevent contamination of the enamel, especially booth enamel, screening may not be required prior to flotation.

As previously indicated, the primary step in the beneficiation process comprising my invention comprises a froth flotation in which the pure frit is separated from the remaining constituents of the reclaim enamel. Flotation differs from blunging principally and fundamentally in that it depends for its success upon the varying surface characteristics of the ingredients to be separated. Blunging, on the other hand, depends for its success upon the difference in size, shape, and specific gravity of the particles to be separated. It is evident, therefore, that the froth flotation process is particularly advantageous in the present instance due to the fact that the particles to be separated have very similar densities and shapes, but differ markedly with respect to their surface characteristics.

There are a number of different types of collectors commonly used in froth flotation processes generally, namely, soap, xanthates or aerofloats, and amines. Soap collectors and xanthate collectors have limited usefulness in the present invention. Amine or similar cationic type collectors are markedly successful, however, in removing clay and other ingredients to produce a product consisting essentially of frit. A number of different cationic collectors may be used, including decamine-cetyl-tri-methyl ammonium bromide, stearyl-trimethyl ammonium bromide, and the primary aliphatic amines having from 8 to 18 carbon atoms and water soluble salts thereof, such as lauryl amine, lauryl amine hydrochloride, and primary cocoanut amines. The amines act as cationic type collectors for the fine inherent impurities in the waste enamel as well as the clay, opacifier, etc. As a result, these materials are taken off in the flotation froth, leaving an underflow consisting essentially of frit.

In order to illustrate the present invention with more particularity and to more readily enable those skilled in the art to practice the present invention, the following specific embodiment thereof will be set forth. To a 20 per cent solids pulp containing 1 ton of waste enamel and 3 tons of water, 5 pounds of hydrochloric acid were added to yield a pH of about 7. The pulp was then passed through a multi-cell flotation machine with a retention time of 6 minutes where about 0.10 pound of lauryl-amine hydrochloride per ton of dry reclaim was added to yield a froth which was continually removed therefrom. The flotation underflow, consisting essentially of frit, was then partially dewatered and re-used by adding thereto conventional amounts of the various components commonly employed in making up an enameling slip or slurry from new frit.

Figure 2:
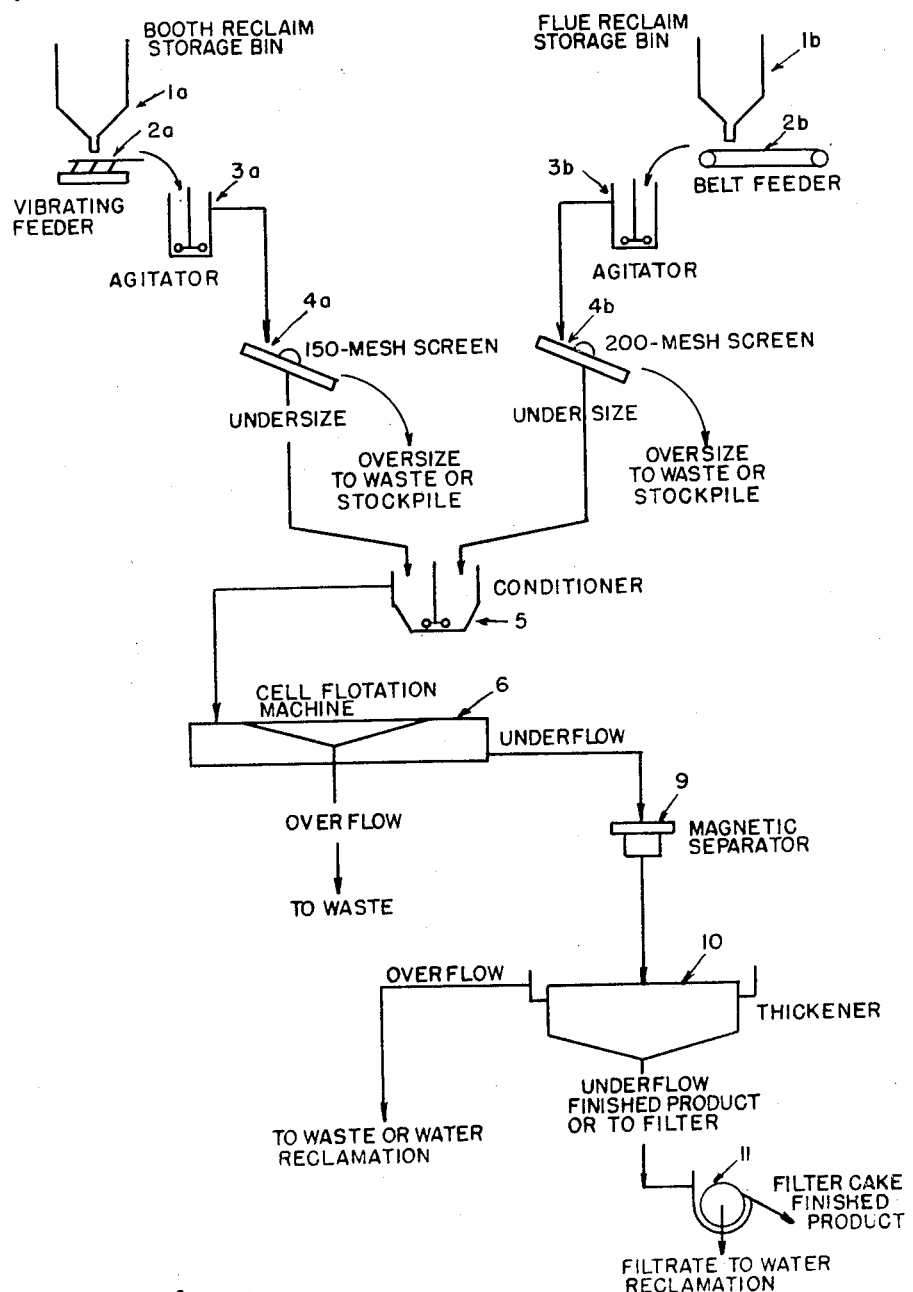
Fig. 2 is a flow sheet of a method for processing a mixture of booth and flue reclaim.

Two methods of practicing the present invention are graphically illustrated in the flow sheets comprising Figures 1 and 2. In Figure 1, booth reclaim stored in the storage bin 1 is dropped onto a vibrating feeder 2 and fed to a 10-mesh scavenger screen 4 through an agitator 3. This scavenger screen 4 removes large objects such as gloves, nails, tobacco, wood, etc., and the undersize is then introduced into a conditioner 5 where it is mixed with water and acid to provide a pulp having 20% solids and a pH of about 7. This pulp is fed to a cell flotation machine 6 in which a collector is introduced. The overflow is discarded and the underflow, consisting essentially of frit, is moved by means of a pump 7 to a 150-mesh screen 8 which removes fine impurities that may cause specking, pitting, etc. The undersize from this 150-mesh screen is passed through a magnetic separator 9 where magnetic impurities, such as metallic scale, are removed. This product is then adjusted to a given solids content by thickening, centrifuging, or filtering to obtain the frit.

The thickening or concentration of the enamel frit may be effected by means of a settling chamber 10 from which the water is decanted by a suitable overflow conduit and from which the underflow is then passed either to a filter 11 for the purpose of producing a dry finish product, or, when the reclaimed frit is to be used in the same plant where the reclaiming operation is performed, the underflow discharge from the settling chamber 10 may be used directly in making up a new slurry with clay and the other components conventionally used in the preparation of an enameling slip preparatory to spraying the same onto the work.

The process represented by Figure 2 is essentially the same as that shown in Figure 1, with a few exceptions necessitated by the treatment of flue reclaim. The booth and flue reclaim are stored separately and screened separately, since the flue reclaim must be screened at 200 mesh instead of 150 mesh sufficient for the booth product.

Reference characters like those employed on Figure 1 are employed on Figure 2 to denote like parts. The sub-scripts $a$ and $b$ are used on those parts of Figure 2 which are in duplicate.

When both booth and flue reclaims are being treated, the screening operation preferably occurs prior to the flotation step, since this order of procedure produces the purest frit. There are certain advantages, however, to treating booth reclaim alone by floating first and then screening, because this procedure permits practically unlimited dilution of the flotation underflow and, thus, more rapid screening. The flotation underflow in Figure 2 is passed through magnetic separators and thickened or filtered to obtain relatively pure frit.

Actual performance tests on two runs using beneficiated reclaim enamel, that is, enamel produced using the frit obtained from the beneficiation process of this invention, and a comparison of the performance of this beneficiated or processed reclaim enamel with new white enamel for the finishing of refrigerator food compartments of 7½ cubic foot volumetric capacity, are given in the following Table 1:

performed on a basis favorably comparable to the standard enamel.

In Run No. 2, however, a much greater percentage of the units coated with processed reclaim enamel were found to pass inspection upon the first operation, this percentage being substantially as high as that obtained when using new frit. This was a truly unexpected result considering the types of results secured when using reclaimed enamel prepared by any of the processes heretofore available.

The flotation process which I employ is preferably a modification of standard practice in processes of this character.

The usual multicell flotation process involves the addition of the collector in approximately equal amounts at spaced intervals. For example, in a six-cell flotation process utilizing an amine as the collector, equal amounts of the amine are normally added in stages, for example, in the first, third, and fifth cells. Generally, the amount of material floated is in proportion to the amount of amine added, so that the process becomes less selective usually with the additions of large amounts of amines. As a result, it is the present practice to employ small quantities of these reagents when selective flotation is desired.

The use of very small amounts of amines in the flotation of flue reclaim enamel, however, results in a large quantity of frit lost in the overflow due to the inherent frothing characteristics of the flue reclaim. About 20 per cent, by weight, of the flue reclaim floats without the addition of any effective amount of amine reagent, and more than 15 per cent, by weight, of a 70:30 mixture of flue reclaim and booth reclaim floats under similar conditions. Since only about 8 to 10 per cent of these reclaim enamels are ingredients other than frit, it is obvious that at least from 5 to 12 per cent, by weight, of the original frit will be lost, constituting a serious loss economically due to the high price of frit. Actually, the loss of frit is greater since under

*Table 1*

| | Inspection | Reclaim | | | | Standard | |
|---|---|---|---|---|---|---|---|
| | | Run No. 1 | | Run No. 2 | | | |
| | | No. of Units | Per Cent | No. of Units | Per Cent | No. of Units | Per Cent |
| | O. K. in one coat | 240 | 53.1 | 818 | 70.1 | 572 | 66.4 |
| | Total reoperate | 212 | 46.9 | 349 | 29.9 | 289 | 33.6 |
| | Total units | 452 | 100.0 | 1167 | 100.0 | 861 | 100.0 |
| 1 | Spot | 54 | 12.0 | 125 | 10.7 | 76 | 8.9 |
| 2 | Patch | 38 | 8.5 | 60 | 5.1 | 74 | 8.7 |
| 3 | Blister | 16 | 3.5 | 9 | 0.8 | 19 | 2.2 |
| 4 | Scale | 5 | 1.1 | 5 | 0.4 | 46 | 5.4 |
| 5 | Poor porcelain | 7 | 1.5 | 3 | 0.3 | 14 | 1.6 |
| 6 | Craze (tearing) | 4 | .9 | 11 | 0.9 | 9 | 1.0 |
| 7 | Bad weld | 15 | 3.3 | 27 | 2.2 | 14 | 1.6 |
| 8 | Bad brush | 11 | 2.4 | 16 | 1.4 | 11 | 1.3 |
| 9 | Dirty porcelain | 6 | 1.3 | 0 | 0 | 1 | .1 |
| 10 | Warp | 2 | .4 | 8 | 0.7 | 8 | .9 |
| 11 | Hairlines | 41 | 9.2 | 42 | 3.6 | 1 | .1 |
| 12 | Groundcoat | 1 | .2 | 0 | 0 | 1 | .1 |
| 13 | Chip | 6 | 1.3 | 0 | 0 | 6 | .7 |
| 14 | Blue | 6 | 1.3 | 10 | 0.9 | 9 | 1.0 |
| 15 | Damaged hole | 0 | 0 | 10 | 0.9 | 0 | 0 |
| 16 | Not square | 0 | 0 | 23 | 2.0 | 0 | 0 |
| | Total reoperate | 212 | 46.9 | 349 | 29.9 | 289 | 33.6 |

Of the defects noted in Run No. 1, only blisters, poor porcelain, craze, and hairlines are due solely to imperfect enamel. In this some trouble was experienced with hairlining of the processed reclaim enamel, but otherwise the reclaim enamel these conditions only a portion of the ingredients of the enamel other than the frit are floated.

It has been found that relatively large additions of the collecting agents added to the first stage of multicell flotation operation counteracts the inherent frothing tendency and suppresses the flotation of frit during enamel flotation, thus permitting later additions to make a much more efficient separation than with the usual methods. As above pointed out, flue reclaim and mixtures of booth and flue reclaims have an inherent tendency to froth when subjected to flotation. The addition of the collector in the first cell in amounts varying between 40 and 75 per cent of the total collector added counteracts this frothing tendency of the reclaim and, thus, prevents the loss of much valuable frit in the overflow. Later additions, of approximately equal amounts, then selectively float the ingredients of the reclaim enamel, other than the frit, leaving the frit in the cell underflow. The total amount of collector, such as an amine, added will depend, of course, upon the particular reclaim enamel to be floated as well as upon the particular collector used, but as a rough estimate between .060 and 0.150 pound of a collector, such as an amine, per ton of reclaim may be employed.

The hydrogen ion concentration of the pulp may vary from 6.5 to 7.5, but it is preferably maintained at about 7. When using an amine collector, the amount of material removed is not in proportion to the amount of collector added, as will be hereinafter disclosed, but small additions of amine made after the first major addition selectively remove the clay, opacifier, color stabilizer, dye, etc., somewhat in proportion to the amount of amine added.

A particular embodiment of the present invention which may be used to more clearly illustrate the same is hereinafter set forth. Booth reclaim porcelain enamel and flue reclaim enamel from a refrigerator enameling plant in which the original enamel contained about 90 per cent, by weight, of frit and 10 per cent, by weight, of additional constituents, such as clay, opacifier, color stabilizing compound, etc., were screened separately at 150 mesh and 200 mesh, respectively, and the undersize from the two screening processes was combined in the proportions of 30 parts of booth reclaim to 70 parts of flue reclaim. This pulp was then adjusted to approximately 20 per cent solids and the pH regulated by hydrochloric acid to about 7. Technical primary cocoanut amine was added as a collector and the data recorded on two test runs are set forth in the tables below.

Table 2 represents the usual practice of adding amine collectors in small amounts in the first cells and increasing this amount in the following cells, whereas Table 3 discloses the method comprising the present invention wherein the practice is to add a large amount of amine in the first cell and smaller amounts in the subsequent cells. The per cent weight in all column headings of the above tables refers to the per cent of the total weight of the enamel processed.

In both Tables 2 and 3 the screening removed approximately 13 per cent of the total weight of the enamel. Actual practice has shown that of this 13 per cent about 11 per cent is frit; consequently, the remaining 2 per cent removed by screening is clay, impurities, etc. Ideally, only the remaining additional constituents amounting to approximately 8 per cent of the total weight of the enamel should be removed by the flotation process. Table 2 shows, however, that 24.6 per cent, by weight, of the enamel is removed in the overflow in the first cell, and that additional amounts of enamel are removed in the subsequent cells until the total amount of reclaim removed approximates 31.2 per cent. As a result, only 59.7 per cent of the original frit remains in the underflow, and approximately 30 per cent of the frit is lost in the overflow from the flotation cells.

It is at once apparent from Table 2 that the amount of material floated is not in direct proportion to the amount of amine added. Almost inverse ratios exist between cell 1 and cells 2 and 3, wherein the .004 pound of amine added to cell 1 floats 24.6 per cent, by weight, of the reclaim, but .025 pound of amine added to cells 2 and 3 floated only 3.7 per cent, by weight, of the reclaim.

In Table 3, about 70 per cent of the total amount of the amine collector added, or .053 pound, was added in the first cell of the multi-cell floation process. The data in this table show that only 2.1 per cent, by weight, of the total weight of the enamel is removed in the froth from this first cell and that only 8.6 per cent is removed by the entire flotation operation. This means, therefore, that only a very small amount of the original frit is lost in the flotation process, enabling the recovery of an

*Table 2*

| Cell No. | Amine in Lbs. per Ton of Reclaim | pH | Per Cent Weight in Flotation Overflow | Per Cent Weight in Screen Oversize | Per Cent Weight Recovered Based on Dry Feed Weight | Estimated Per Cent Weight Frit Recovered |
|---|---|---|---|---|---|---|
| 1 | 0.004 | | 24.6 | | | |
| 2 and 3 | 0.025 | | 3.7 | | | |
| 4, 5, and 6 | 0.015 | | 2.9 | | | |
| | 0.044 | 7.2 | 31.2 | 13.3 | 55.5 | 59.7 |

*Table 3*

| Cell No. | Amine in Lbs. per Ton of Reclaim | pH | Per Cent Weight in Flotation Overflow | Per Cent Weight in Screen Oversize | Per Cent Weight Recovered Based on Dry Feed Weight | Estimated Per Cent Weight Frit Recovered |
|---|---|---|---|---|---|---|
| 1 | 0.053 | | 2.1 | | | |
| 2 and 3 | 0.010 | | 2.3 | | | |
| 4, 5, and 6 | 0.011 | | 4.2 | | | |
| | 0.074 | 6.6 | 8.6 | 13.0 | 78.4 | 84.2 | estimated 84.2 per cent of the original frit.

Here again the amount of amine added is disproportionate to the amount of reclaim floated. The froth-reducing properties of the increased amount of amine in the first cell is evident from the fact that one-fifth the amount of amine that was added in the first cell removed the same amount of reclaim from cells 2 and 3, and that twice as much reclaim was floated in cells 4, 5, and 6, again using one-fifth as much amine as in the first cell.

Under some conditions, as little as 40 per cent of the total weight of amine may be added to the first cell and still adequately reduce frothing of the pulp, as illustrated in the following Table 4:

Table 4

| Amine Addition in Lbs. per Ton of Reclaim | | Per Cent Weight in Flotation Overflow | |
|---|---|---|---|
| Cell 1 | 0.034 | Cells 1, 2, 3 | 6.9 |
| Cell 3 | 0.026 | Cells 4, 5, 6 | 4.9 |
| Cell 5 | 0.020 | | |
| | 0.080 | | 11.8 |

The test conditions employed in obtaining the data in Table 4, that is, the type of reclaim, amine used, etc., were similar to those used in connection with the above-described tests. Further reduction of frothing may be obtained in the test shown in Table 4, by adding more amine in the first cell and this is frequently desirable. In both Tables 3 and 4 a much greater amount of amine was added to the flotation cells than in Table 2, yet only one-third to one-fourth the amount of material was floated in the tests indicated in Tables 3 and 4 as was floated in the test shown in Table 2. This provides further proof that the normal flotation of material, approximately in proportion to the amount of amine added, is not the case in the flotation of rec'aim enamels containing flue reclaim.

It is evident from the above-detailed description that the present invention relates to a general process which includes subjecting waste enamel to froth flotation to secure relatively pure frit. By practicing the present invention, reclaimed frit of high puritiy is obtained which may be successfully employed in final coats or in one-coat processes, particularly light-colored or white enamels. This process is further advantageous in that it is capable of wide variation and requires but one flotation agent.

Variations and modifications of the general process will become apparent to those skilled in the art. For example, finer mesh screens may be used, if desired, for screening both the booth and flue reclaims. Magnetic separation may be incorporated as a safeguard against metallic iron, magnetic scale, and other magnetic ingredients. The period of flotation may be lengthened or shortened, depending upon the purity of frit desired. The pH of the flotation pulp may be varied from 6.5 and 7.5, but a pH of 7 is advantageous in that, this being a neutral value, the character of the froth is best.

Throughout the foregoing description, reference has been made to separately screening the flue reclaim and the booth reclaim. It is within the contemplation of this invention to admix those materials and simultaneously screen such admixture, in which case a 200-mesh screen should preferably be employed.

Other variations and modification of the specific flotation step of this invention will become apparent to those skilled in the art. For example, the present invention may be practiced in single-cell operations, if the first amine addition is made in a conditioner prior to flotation since the large amine addition reduces frothing even in such operations.

It is evident from the detailed description of the specific flotation step that such feature of the present invention relates to a method of beneficiating waste enamels by amine flotation, which comprises adding a large amount of the total addition of amine collector in the early stages of operation. By practicing such step of the present invention, a much greater proportion of the original frit in the enamel is recovered than by the usual amine flotation methods. This feature is of considerable commercial important due to the high value of frit.

Other modes of applying the principle of the invention may be employed, change being made as regards the details described, provided the features stated in any of the following claims or the equivalent of such be employed.

I, therefore, particularly point out and distinctly claim as my invention:

1. A method for reclaiming frit from a previously milled porcelain enamel mass which contains a substantial portion of clay, which comprises passing the enamel mass through at least a 150 mesh screen to substantially completely remove all particles greater than 60 to 74 microns in size, and then by the process of multicell froth flotation separating the major proportion of such clay from the frit, such froth flotation process characterized in that at least 40% and not more than 75% of the total weight of the amine collector used is introduced in the first cell, whereby excessive frothing is prevented which would otherwise carry over a substantial portion of the frit fines.

2. A method for reclaiming frit from a previously milled porcelain enamel mass, containing principally frit with minor amounts of clay, opacifier, and color stabilizing compound which comprises passing the porcelain enamel mass through at least a 150 mesh screen, and then by the process of multicell froth flotation, separating the major proportion of such clay, opacifier, and color stabilizing compound from the frit, such froth flotation process characterized in that about 0.060 lb. to about 0.15 lb. per ton of reclaim of technical primary cocoanut amine collector is added thereto and at least 40% and not more than 75% of the total weight of the collector used is introduced in the first cell, whereby excessive frothing is prevented which would otherwise carry over a substantial portion of the frit fines.

3. A method for reclaiming frit from a previously milled porcelain enamel mass which contains a substantial portion of clay, which comprises adding sufficient acid to said enamel mass to obtain a pH of about 7, passing the acidity adjusted enamel mass through at least a 150 mesh screen to substantially completely remove all adventitiously large enough elements to be individually apparent to the naked eye, and then by the process of multicell froth flotation separating the major proportion of such clay from the frit, such froth flotation process characterized in that about 0.060 lb. to about 0.15 lb. per ton of reclaim of technical primary cocoanut amine collector is added thereto and at least 40% and not more than 75% of the total weight of the collector used is introduced in the first cell, whereby excessive frothing is prevented which would otherwise carry over a substantial portion of the frit fines.

DONALD W. SCOTT.

REFERENCES CITED

The following references are of record in the file of this patent:

The Enamelist, vol. 22, No. 12, Sept. 1945, pages 4 and 5.

Bulletin American Ceramic Society, vol. 19, 1940, pages 252–253.

Bureau of Mines Technical Bulletin 449, page 51.

Taggart Handbook of Mineral Dressing, 1945, section 12, pages 02 and 88.

Mineral Industry for 1939, page 663.